United States Patent [19]
Anhegger et al.

[11] 4,050,471
[45] Sept. 27, 1977

[54] CLOSING APPARATUS FOR VENTILATION LINES OF FUEL TANKS IN MOTOR VEHICLES

[75] Inventors: Sigmund Anhegger, Renningen; Hans Colell, Schwieberdingen, both of Germany

[73] Assignee: Dr. -Ing. H.c.F. Porsche Aktiengesellschaft, Germany

[21] Appl. No.: 650,856

[22] Filed: Jan. 21, 1976

[30] Foreign Application Priority Data

Jan. 30, 1975 Germany .............................. 2503731

[51] Int. Cl.² ............................................. F16K 17/36
[52] U.S. Cl. ......................................... 137/39; 137/43
[58] Field of Search ............................... 137/38, 39, 43

[56] References Cited
U.S. PATENT DOCUMENTS

| | | | |
|---|---|---|---|
| 1,683,338 | 9/1928 | Evinrude | 137/43 |
| 2,074,329 | 3/1937 | Gieseman | 137/43 X |
| 2,919,707 | 1/1960 | Seidler | 137/39 |
| 3,011,503 | 12/1961 | Widham | 137/43 |
| 3,765,435 | 10/1973 | Schlanzky | 137/39 |
| 3,768,498 | 10/1973 | Urban | 137/43 |
| 3,916,928 | 11/1975 | Enoch | 137/43 X |

Primary Examiner—Robert G. Nilson
Attorney, Agent, or Firm—Craig & Antonelli

[57] ABSTRACT

A valving mechanism or closing apparatus for ventilation lines of fuel tanks in motor vehicles is provided which comprises a housing and closing elements contained in the housing, which closing elements are movable in accordance with the vehicle position. The closing elements are formed as movable members, one above the other, with the lower member being a mass body lying against a guide wall of the housing and being freely movable to a certain extent, while the upper element acts to close an exit opening of the housing, thereby closing the ventilation line. The lower mass body element may be conically configured to match the conically configured guide wall of the housing, or the mass body may be a ball shaped body which moves along the guide wall of the housing. The upper element may also be a floating body such that an overflow of gasoline into the housing causes the floating body to close the exit opening, thereby preventing discharge of fuel out of the ventilation line.

5 Claims, 4 Drawing Figures

CLOSING APPARATUS FOR VENTILATION LINES OF FUEL TANKS IN MOTOR VEHICLES

The invention relates to a valve mechanism or closing apparatus for ventilating lines of fuel tanks in motor vehicles which comprises a housing with closing elements being operated in accordance with the vehicle position.

A ventilating system having a closing device for a fuel tank has been previously contemplated in U.S. Pat. No. 2,942,612 in which a housing includes two chambers disposed one next to the other and constructed to accommodate closing elements, such as balls. A portion of the walls of these two chambers is provided with connection openings, which depending on the position of the vehicle, are closed by the closing elements. Such an arrangement has the disadvantage that the housing is constructed structurally and economically complex. In addition, when the fuel tank is overfilled, and when the vehicle is in a normal position, fuel will discharge into the atmosphere through the closing apparatus, thereby causing a pollution problem contrary to acceptable motor vehicle construction the world over.

Therefore, an object of the present invention is to provide a closing apparatus, simple in construction, which distinguishes itself by an effective operation useful in many countries.

This is accomplished according to the invention by constructing the closing elements as elements arranged one above the other in a housing in the ventilation line, wherein the lower element is constructed as a mass body lying against a guide wall of the housing and being freely movable to a predetermined extent, and wherein the upper element serves for closing the ventilation line at an exit opening of the housing. In this arrangement, the mass body and guide wall are advantageously constructed conically, while the upper element is constructed ball-shaped. The upper element protrudes into a chamfer of the exit opening, and may be arranged in a cavity or recess of a horizontal top surface of the mass body. In addition, the upper element may be constructed as a floating body. The housing may consist of two plates arranged one above the other with the guide wall being provided at the lower plate.

In a further construction, the mass body may also be constructed as a ball on which the floating body rests. A sealing section such as an annular protrusion about the exit opening, is provided between the floating body and the housing. In this arrangement, the housing may consist of two circularly cylindrical portions or members, which are connected with each other, such as through friction welding.

The advantages attained with the invention can be seen in that the closing apparatus, by means of the elements arranged one above the other inside the housing, is simple in construction. Furthermore, the function of the closing apparatus is reliable since upon tilting of the vehicle, the mass body glides along the guide wall to move the upper element into a closing position of the exit opening. Further, the construction of the upper element as a floating body advantageously provides that when the fuel gets into the closing apparatus as a result of an overfilled fuel tank, the fuel will force the floating body upwardly so as to close the exit opening. By this means, no fuel can be discharged into the atmosphere or especially into a pollution control element of the ventilation line, such as an activated carbon filter.

The structure and features of the invention may be seen by reference to the following non-limitative embodiments illustrated in the drawing figures, wherein FIG. 1 shows a schematic illustration of a motor vehicle including the closing apparatus according to the present invention;

Figure 1:
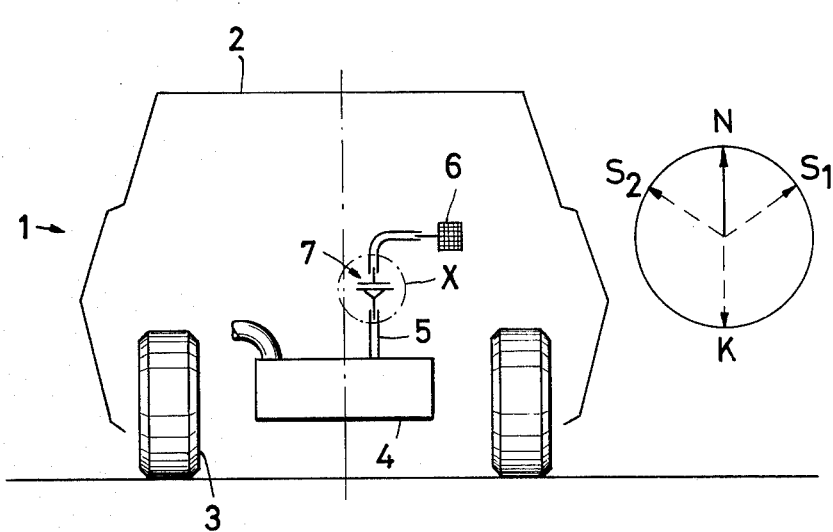

The motor vehicle 1 illustrated in FIG. 1, comprises an upper structure 2 which is supported by wheels 3 in a conventional manner. A fuel tank 4 is provided inside the upper structure 2, which fuel tank 4 is provided with ventilation line 5 for the ventilation or aeration of the tank. An activated carbon filter 6 is attached to the ventilation line 5 through which a discharge of harmful fuel vapors into the atmosphere may be prevented.

In addition, the ventilation line is provided with a closing apparatus 7 which assures that, when the motor vehicle 1 is in a normal position N, the fuel tank 4 is vented, while when the motor vehicle 1 is tilted toward the side positions $S_1$ or $S_2$, or in a head-over position K, such as may occur during a roll-over accident, no fuel can discharge into the atmosphere, nor especially into the activated carbon filter.

Figure 2:
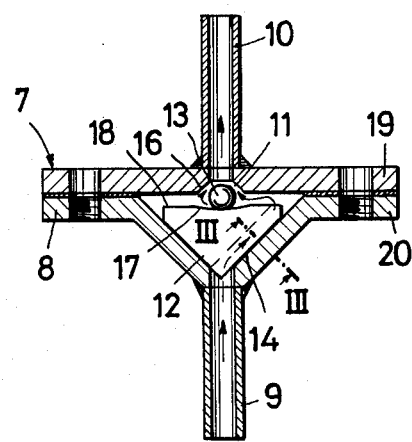
FIG. 2 shows in detail the closing apparatus of the present invention included in the area X in FIG. 1.

As may be seen from FIG. 2, the closing apparatus 7 may comprise a housing 8 having an inlet line 9 and a discharge line 10. The discharge line 10 has an exit opening 11 at the housing 8. Closing elements are provided in the housing 8 which are formed of two elements 12 and 13 arranged one above the other. The lower element 12 is constructed as a mass body and rests against a guide wall 14 of the housing 8 and freely movable to a predetermined extent. The upper element 13 serves for closing the exit opening 11.

Figure 3:
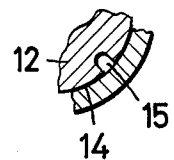
FIG. 3 shows a section along line III—III of FIG. 2.

The mass body element 12 and the control or guide wall 14 are constructed with a conical configuration in matching relationship wherein the converging area points downwardly. Between the control wall 14 and the mass body element 12 is provided a flow-through canal 15. This canal 15 is arranged in the mass body element 12 as may be seen from FIG. 3.

The upper element 13 is illustrated in FIG. 2 as a ball-shaped body which protrudes into a chamfer 16 of the exit opening 11 so as to require only a small moving space. On the other hand, the element 13 may lie in a depression 17 on the upper horizontal wall 18 of the lower element 12.

The housing 8 consists of two plates 19 and 20 arranged one above the other. The guide wall 14 is provided at the lower plate 20, and forms a chamber in which the closing elements 12 and 13 are disposed.

In the normal position N of the motor vehicle 1, ventilation of the fuel tank 4 is accomplished through the through-flow canal 15 and the exit opening 11 in the manner illustrated by the arrows in FIG. 2. When the motor vehicle is tilted to a position $S_1$ or $S_2$, the mass body glides along the guide wall 14 and presses the element 13 into the exit opening 11. By this means, no fuel nor vapor can discharge through the discharge line 10. The same operation occurs when the motor vehicle is in the head-over position K such as occurs during roll-over accidents.

The upper element 13 may also be constructed as a floatbody with a corresponding specific gravity such that fuel entering the closing apparatus 7, for example in an over-filled fuel tank, raises element 12 to close the exit opening 11 by the float body 13.

Figure 4:
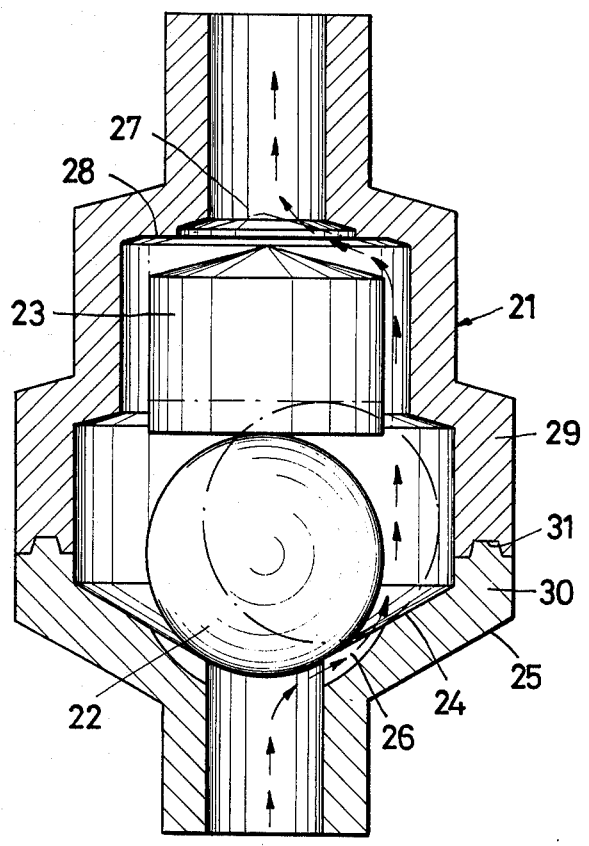
FIG. 4 shows another embodiment according to the invention.

According to the embodiment of FIG. 4, the lower mass body element 22 may be ball-shaped in the closing apparatus 21. Upper element 23 rests on element 22, and is shaped as a piston. Element 23 may also be formed as a float-body which is constructed hollow.

The guide wall 24 of housing 25 is of a conical shape and includes a through-flow canal 26 which is formed by a milled slot.

A sealing section 28 is provided between the exit opening 27 and the element 23. In the exemplified embodiment of FIG. 4, the sealing section 28 is arranged as an annular collar portion of the housing 25 about the exit opening 27.

The housing 25 consists of two circularly-cylindrical parts 29 and 30 which are connected to each other at 31 by welding, preferably friction welding, glueing or the like. While we have shown and described several embodiments in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What we claim is:

1. In a closing apparatus for ventilating lines of fuel tanks in vehicles, said closing apparatus comprising a housing in a ventilating line and movable closing means within said housing for closing said ventilating line in accordance with the position of a vehicle, the improvement comprising said closing means including a first ball-shaped movable member and a second movable member, said first member being disposed in a depression of a horizontal top surface of said second member above said second member, said second member being a conically configured mass body resting matingly on a conically configured guide wall of said housing, said mass body being guided in slidable movement along said guide wall, and said first member being movable to close said ventilating line at an exit opening of said housing.

2. A closing apparatus according to claim 1, wherein said first member is a float-body.

3. A closing apparatus according to claim 1, wherein said first member protrudes into a chamfer of said exit opening.

4. A closing apparatus according to claim 1, wherein said housing includes two plates secured together one above the other, and wherein said guide wall is provided at the lower plate of said two plates.

5. A closing apparatus according to claim 1, wherein a channel means is disposed in a conical wall of said mass body for accommodating passage of fluid.

* * * * *